United States Patent [19]

Gluntz et al.

[11] Patent Number: 5,102,617
[45] Date of Patent: Apr. 7, 1992

[54] PASSIVE COOLING MEANS FOR WATER COOLED NUCLEAR REACTOR PLANTS

[75] Inventors: Douglas M. Gluntz, San Jose; Willem J. Oosterkamp, Los Gatos; Rudolf M. van Kuijk, Cupertino, all of Calif.

[73] Assignee: General Electric Company, San Jose, Calif.

[21] Appl. No.: 580,672

[22] Filed: Sep. 11, 1990

[51] Int. Cl.⁵ .................................. C21C 15/18
[52] U.S. Cl. .................................. 376/283
[58] Field of Search ............... 376/283, 282, 298, 299, 376/293

[56] References Cited

U.S. PATENT DOCUMENTS

| | | | |
|---|---|---|---|
| 4,022,655 | 5/1977 | Gaouditz et al. | 376/283 |
| 4,753,771 | 6/1988 | Conway et al. | 376/283 |
| 4,889,682 | 12/1989 | Gou et al. | 376/283 |
| 4,948,554 | 8/1990 | Gou et al. | 376/283 |
| 4,950,448 | 8/1990 | Gou et al. | 376/283 |

Primary Examiner—Brooks H. Hunt
Assistant Examiner—Frederick H. Voss
Attorney, Agent, or Firm—R. R. Schroeder

[57] ABSTRACT

An improved passive cooling system for water cooled and moderated nuclear fission reaction plants provides means for enhancing the cooling arrangement for coping with loss of coolant accidents or removing decay heat during periods of reactor shutdown. The improvement comprises providing a measure consisting of a tubular sleeve, which encourages flow circulation within a pool of cooling water.

10 Claims, 4 Drawing Sheets

PASSIVE COOLING MEANS FOR WATER COOLED NUCLEAR REACTOR PLANTS

FIELD OF THE INVENTION

This invention relates to water cooled and moderated nuclear fission reactor plants commonly used for the production of steam for driving turbines to generate electrical power. The invention comprises an improvement in a particular passive or self-acting steam condensing and/or cooling system for service with such water cooled nuclear reactor plants.

BACKGROUND OF THE INVENTION

Typically nuclear fission reactors for power generation are housed within a containment structure as a safety measure. Nuclear reactor containments are designed and employed to enclose the nuclear reactor pressure vessel containing the core of heat generating fissionable fuel and ancillary components of the system, such as portions of the coolant/heat transferring fluid carrying conduits or other associated means which constitute a source of and/or means for the conveyance of radiation and/or fission products. As such, the containment structure housing a nuclear reactor plant must effectively isolate the reactor and related components enclosed within its confines by sealing-in all contents including any water, steam, gases or vapor and entrained fission products or other sources of radiation that may have escaped from the reactor pressure vessel and in particular from its associated cooling and heat transferring system including the main steam condensed coolant water loop.

In the event of certain malfunctions in a nuclear reactor system, such as a significant loss of coolant accident which may be due to a major breach of a main conduit, large volumes of very hot pressurized water and/or steam may be released into the interior of the containment structure. The very hot pressurized water, which is likely to carry along entrained radioactive fission products, will flash into steam and in turn substantially increase the pressure and temperature within the containment structure. Accidents of this nature can result in very high pressure and temperature conditions within the confines of the leak proof containment structure whereby such an occurrence has the potential of impairing the integrity and/or function of the containment structure.

Potentially high pressures and temperatures due to the inherent high thermal energy produced by a reactor and flashing steam cannot be released by venting from the containment structure or otherwise be permitted to escape into the outside atmosphere since the steam vapor and fluid may entrain and carry radioactive fission products which would also be released into the environment.

Common commercial boiling water cooled and moderated nuclear fission reactors employed for electrical power generation are normally provided with one or more suppression pool chambers within the reactor plant containment structure. A suppression pool chamber is utilized to provide a large reservoir of cooling water available for condensing steam released from the reactor pressure vessel and its associated steam/coolant water loops or circuits, or escaping therefrom due to an accident, and also for further cooling down condensed steam and released or escaped hot water. Suppression pool chambers commonly are circular or semicircular with one or more pools extending substantially around the fuel containing reactor pressure vessel at an appropriate elevation, and may be constructed as a single chamber or several individual chambers each containing a condensing and cooling pool of water. Appropriate fluid conduits are provided for conveying steam and/or hot water to below the surface of the water of the pool in the suppression chamber for condensing the steam and/or cooling hot water.

Recent proposals in the nuclear reactor industry comprise various passive or self-activating or operating heat removing safety systems that function by means of inherent natural phenomena such as a hydrostatic head, pressure differences and/or fluid heat convection which provide added safety measure. One such system comprises the inclusion of an isolation condenser system comprising one or more closed vessels holding a pool of cooling water which are housed within the reactor containment structure and sealed to isolate the pool from the atmosphere of the containment structure and any possible containments therein. Such an isolation container(s) with its isolated cooling water is vented to the external atmosphere to release any significant increases in pressure or heat introduced through its cooling function. Thus, excessive heat can be disposed of by indirectly transferring it to the cooling water of an isolation condenser and in turn dissipating it out into the outside atmosphere without permitting the escape of any radioactive contaminants out into the atmosphere.

One or more closed heat exchangers are provided submerged within the pool(s) of cooling water contained within the isolation condenser vessel(s) for transferring heat energy to the cooling water, which in turn can be vented out into the external atmosphere. Such heat exchangers provide for passing steam, hot water and gases from the reactor pressure vessel and its related heat conveying circuits, and/or from the containment structure atmosphere through closed fluid carrying ducts immersed in the isolation condenser cooling pool(s) for dissipation of heat into the isolated cooling water. Excessive heat can thus be dispelled indirectly out into the atmosphere free of any radioactive contaminants while returning cooled fluid back into the reactor system with any entrained contaminants. Liquid water condensate produced from steam cooled in a heat exchanger immersed in the cooling pool at an isolation condenser can be conveyed back into the reactor pressure vessel or related components for use as a coolant.

Additionally these passive safety heat removing systems can comprise one or more elevated, gravity feed auxiliary coolant water supply pools retained in a chamber(s) or vessel(s) located within the containment structure at an elevation substantially above the core of fissionable heat producing fuel within the reactor pressure vessel. This gravity feed auxiliary coolant supply pool is available to provide additional cooling water to the fuel core and/or other components to preclude overheating due to an accidental loss of the reactor's operating coolant.

One recently proposed arrangement of a composite passive cooling means for boiling water cooled nuclear reactor plants comprises a unique system for interconnecting several components provided for condensing steam and cooling aspects of such reactor plants to enhance safety and performance. This interconnecting arrangement comprises adding at least one fluid carrying conduit having a valve for optionally controlling fluid communication between the interior of the reactor pressure vessel and the inlet into one or more heat exchanger units submerged in the isolated pool of cooling water of the isolation condenser(s). Thus, on the occurrence of a mishap or reactor shutdown, excess heat due to the malfunction, or of decay of the nonfissioning fuel during shutdown, can be transferred to a heat exchanger unit within an isolation condenser for dissipation. The control valve is provided with manual or automatic means for its operation upon the occurrence of an event calling for additional cooling capacity.

Additionally the interconnecting arrangement comprises a fluid carrying conduit(s) similarly leading into the inlet of one or more heat exchanger units of the isolation condenser(s) and having a valve for optionally controlling its reception of fluid from the area external of the reactor pressure vessel and within the containment structure. Thus, upon steam and or hot water escaping or being released out from the reactor pressure vessel or associated conduits, which raises the temperature and/or pressure within the containment housing structure, fluid of the overheated and/or pressurized atmosphere within the containment can be conveyed through the valve controlled fluid carrying conduit into the inlet of the heat exchanger unit(s) for condensing and/or cooling. This releases any excessive temperature and/or pressure occurring within the containment housing structure thereby precluding possible damage to the isolated containment structure.

A further aspect of this proposed arrangement comprises providing a fluid communicating conduit extending down from the outlet(s) of the heat exchanger unit(s) submerged in the cooling water pool of the isolation condenser(s) to the elevated gravity feed auxiliary coolant water supply pool(s). This conduit conveys liquid condensate from the heat exchanger unit(s) to the gravity feed auxiliary coolant water supply pool(s) for the purpose of augmenting or resupplying cooling water thereto and in turn reuse as a cooling medium.

To inhibit any rapid combining reaction of oxygen from the containment atmosphere with hydrogen released by a reaction of steam components of the reactor fuel core such as fuel element zirconium container metal or alloys, which reaction can result in a generation of hazardous hydrogen following a mishap that has caused the fuel materials to reach abnormally high temperatures, the area within the containment structure housing may be purged of atmospheric air and filled with nitrogen gas. However, nitrogen, which is noncondensible under reactor operating conditions, can be forced by high pressures produced within the containment housing structure along with other fluids such as steam into the conduit carrying fluids through the heat exchanger unit(s) submerged in the cooling water pool of the isolation condenser(s). Noncondensible gases such as nitrogen, carried along mixed with liquid water condensed from steam within the heat exchanger unit(s), cannot be utilized as a reactor coolant and returned into the reactor pressure vessel along with condensate water, or in related coolant systems. To deal with this possible situation, a liquid/vapor phase separating device is provided to segregate condensed liquid from such a mixture as a liquid condensate component for recycling and coolant service within the reactor system, and isolates the vapor component comprising noncondensible gas such as nitrogen together with any remaining uncondensed steam and other gases. This latter vapor component is conveyed to the suppression pool for further cooling and condensation of any remaining uncondensed steam. To accomplish this final cooling and condensation process one or more fluid carrying conduits is provided extending from a vapor outlet of the liquid/vapor phase separator to just below the surface of the water pool in the suppression pool(s) to attain further cooling and condensing of the separated vapor.

The term "maximum submerged depth" is used to describe the range of acceptable elevations of the outlet (56) of conduit (54) communicating with the liquid/vapor phase separating component projecting down beneath the surface of the water pool (24) in the suppression pool chamber 22.

Figure 2:
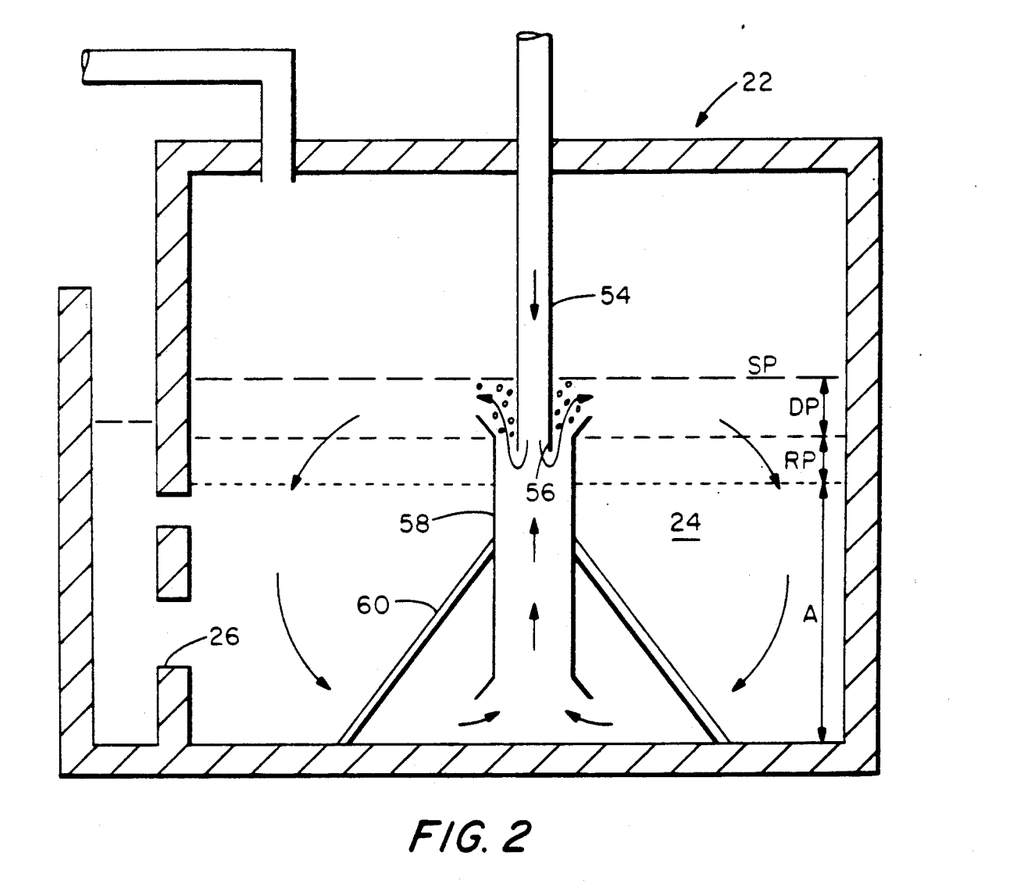
FIG. 2 is a detailed, enlarged sectional view of a suppression pool chamber.

Referring to the diagram shown in FIG. 2 of the drawing, the term "maximum submerged depth" is defined by the following. S/P illustrates the normal operating level of the water pool in the suppression pool chamber, and D/P the drawdown level. R/P illustrates the range of acceptable elevations (submergences) of the outlet of the conduit (C) communicating with the liquid/vapor phase separating component projecting down beneath the water pool surface of the suppression pool chamber. Zone A illustrates a zone of elevations in the water pool of the suppressions pool for which, if the conduit is terminated anywhere within this zone, desired steam/vapor flows through the heat exchanger and then through/along conduit (C) and terminating within the suppression pool are no longer the favored pathway (as governed by circuit pressure-drop process) compared with alternative pathways into the suppression pool (provided by the containment design configuration) for this steam/vapor proclivity to find its way into the lowest pressure region of the containment.

The outlet of conduit C is positioned within a narrow range of acceptable elevations within the suppression pool. By so positioning the outlet of the conduit within this range, a preferred flow pathway is afforded for steam vapor produced in the reactor. Along this "preferred pathway" is the heat exchanger followed by the liquid/vapor phase separator followed by the said conduit so that by the fluid media thus flowing along this preferred pathway a desired heat rejection (to the external pool) consequential to steam condensation will occur in a continuously-occurring mode. The pool elevation coinciding with the uppermost boundary to the said range of acceptable elevations is that particular elevation corresponding to the drawdown elevation to which the suppression pool depth contracts, following an accident or event for which the subject cooling system is designed to mitigate. The pool elevation coinciding with the lowermost boundary to the said range of acceptable elevations corresponds to the "maximum submergence depth" for the conduit, below which the desired flow pathway through/along the said conduit no longer remains the favored pathway for steam vapor to communicate with the suppression pool, because of the presence of alternative flow pathways presenting lower pathways flow resistance for other purpose by the pressure suppression containment design.

SUMMARY OF THE INVENTION

This invention comprises an improvement in a unique passive cooling safety system for water cooled and moderated nuclear reactor plants. The improvement of the invention provides for more effective cooling in the suppression pool through enhanced pool circulation. The invention employs a simple sleeve strategically deployed within the cooling water of a suppression pool adjacent to the vapor discharge conduit which induces an extensive circulating flow path throughout the cooling water pool.

OBJECTS OF THE INVENTION

It is a primary object of this invention to provide a new and improved passive cooling system for water cooled nuclear fission reactor plants.

It is also an object of this invention to provide an improved passive cooling system for water cooled nuclear fission reactor plants which enhances the cooling mechanism by means of increased coolant circulation.

It is a further object of this invention to provide an improved passive or self-acting cooling system comprising a unique arrangement of interconnecting several cooling means.

It is a still further object of this invention to provide a means of enhancing the cooling capacity of the water contents of a nuclear reactor suppression pool.

It is another object of this invention to provide an improved passive cooling system for water cooled nuclear fission reactor plants which inhibits stratification of the cooling water in a reactor suppression pool and fosters greater coolant circulation therein.

DETAILED DESCRIPTION OF THE INVENTION

Figure 1:
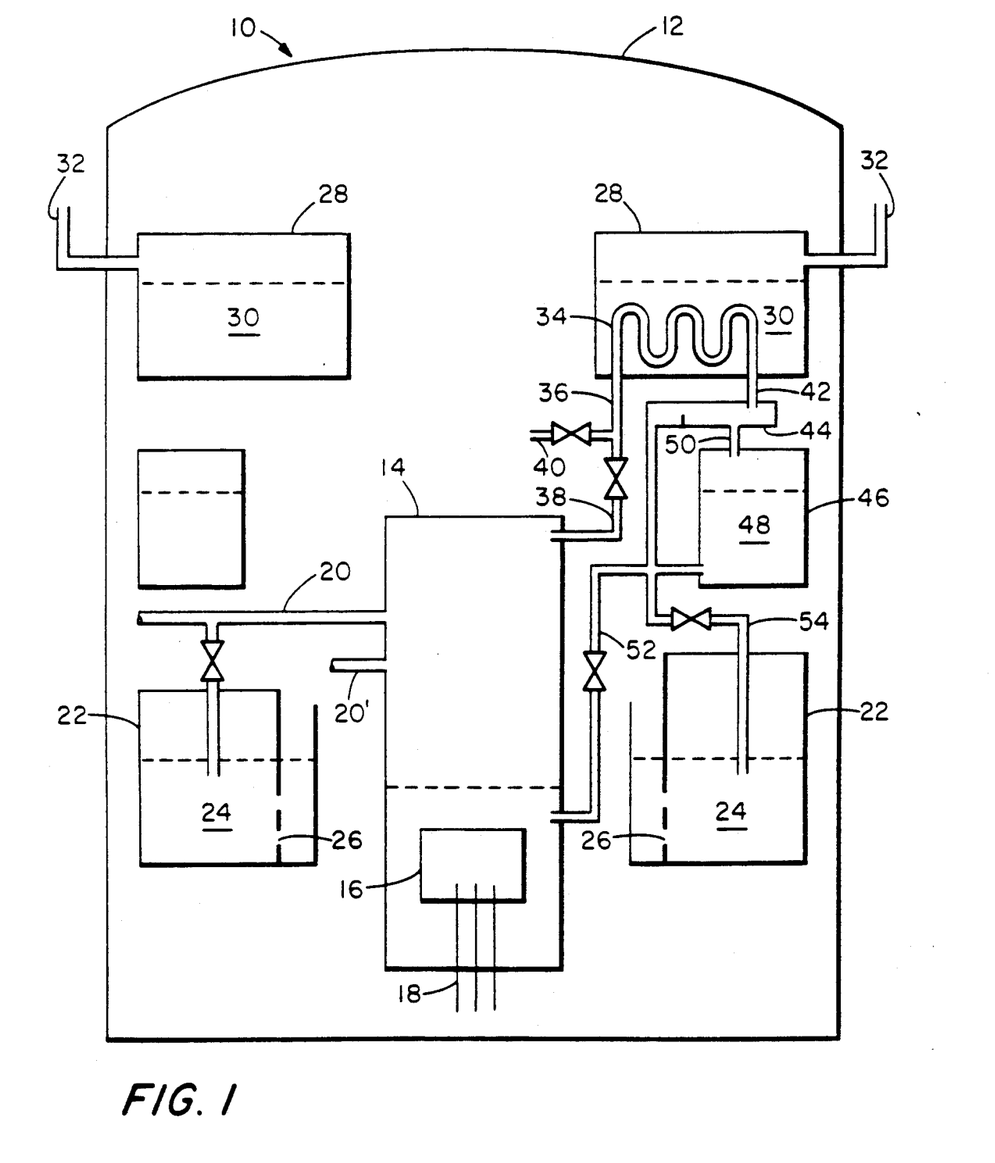
FIG. 1 is a vertical sectional view of a nuclear reactor plant comprising a containment structure housing a nuclear reactor pressure vessel and associated components of an auxiliary cooling system.

Referring to the drawings, FIG. 1 in particular, a typical water cooled and moderated nuclear fission reactor plant 10 designed to produce steam for generating electrical power, comprises a containment structure 12 housing a nuclear reactor pressure vessel 14. The containment structure 12 is designed and constructed to isolate the nuclear reactor and related components containing radioactive ingredients enclosed within its confines and seals-in all radioactive materials and sources thereof from the external atmosphere. The reactor pressure vessel 14 contains a core 16 of heat producing fissionable fuel such as enriched uranium dioxide. Control rods 18 containing neutron absorbing material are reciprocally movable into and out from the fuel core 16 to regulate the rate of the neutron activated fission reaction of the fuel and to terminate the fission reaction by starving the fuel of the necessary neutrons.

Coolant water passing through the heat producing fuel core removes heat and is converted to steam. The steam is circulated through loop comprising a steam conduit 20 conveying the steam to a turbine (not shown) and then a condensate conduit 20' for returning the expended and condensed steam to the reactor vessel for recycling.

Water cooled, steam generating nuclear reactor plants are conventionally provided with one or more suppression pool chambers 22 containing a pool of condensing coolant water 24. The suppression pool chamber(s) 22 is typically circular or semicircular extending substantially around the pressure vessel 14. The suppression pool coolant water 24 serves to condense and cool steam and/or hot water released or escaped from the reactor pressure vessel 14 or associated components such as the steam conduit 20 of the circulating loop. The release or escape of high pressure steam and/or hot water may be due to normal shutdown or a mishap such as a breach or overheating. In any case, the steam and/or hot water is injected into the suppression pool beneath the surface of the water coolant. The suppression pool chamber(s) 22 is provided with vents 26 to equalize its internal pressure with the environment within the containment structure 12 and thereby relieve any raised pressures due to temperature increase produced by the condensing and cooling function.

A contemporary reactor design includes an isolation container(s) 28 enclosing a pool of coolant water 30 which is isolated from the environment of the containment structure 12 and has a vent(s) 32 to the atmosphere external of the containment structure 12. The isolation container(s) 28 and coolant pool(s) 30 is positioned at a level above the reactor pressure vessel 14, and as with the suppression pool chamber 22, typically consists of one or more units arranged in a circular or semicircular pattern extending substantially around and above the reactor pressure vessel 14. The isolation container(s) 28 can be located either within or outside of the containment structure 12.

One or more heat exchanger units 34 is located submerged in the pool(s) of coolant water 30 enclosed within the isolation container(s) 28. The heat exchanger units 34 are closed from the pool(s) of coolant water 30 which are completely isolated from the atmosphere of the containment structure 12 and any radioactive contaminants therein.

The heat exchanger unit(s) 34 is provided with at least one inlet 36 which is in fluid communication with the interior of the reactor pressure vessel 14 by means of fluid conduit 38. Fluid conduit 38 includes a flow controlling valve to provide optional fluid communication between the reactor pressure vessel 14 and the heat exchanger unit 34 whereby pressure and heat can be released from the reactor vessel 14 by release of fluid including steam therefrom to the heat exchanger unit 34 for cooling and condensing.

Heat exchanger unit(s) 34 is additionally provided with at least one inlet 36 in fluid communication with the interior atmosphere of the containment structure 12 housing the reactor pressure vessel 14 and related components by means of fluid conduit 40. Fluid conduit 40 likewise includes a flow controlling valve to provide optional fluid communication between the open area enclosed within the containment structure 12 and the heat exchanger unit 34. Thus increased pressure and heat can be released from within the containment structure 12 due to leakage or release into the area of fluid including steam therefrom, into the heat exchanger unit 34 for cooling and condensing.

Heat exchanger unit(s) 34 is provided with at least one outlet 42 which is in fluid communication with a liquid/vapor or gas phase separating device(s) 44 for segregating the condensation derived liquid phase formed within the heat exchanger unit 34 from the vapor phase comprising noncondensable gases with any residual steam and the like gases. The liquid/vapor phase separating device(s) 44 can be located either within or outside of the containment structure 12. Moreover, the heat exchanger 34 and the liquid/vapor phase separating device 44 can be integrated into a composite unit.

Liquid/vapor phase separating device 44 conveys liquid water condensate to a gravity feed auxiliary coolant supply chamber(s) 46, through fluid conduit 50. One or more gravity feed auxiliary coolant supply chambers 46 are located within the containment structure 12 housing the reactor pressure vessel 14 at a level above the fuel core 16 within the pressure vessel 14. Thus a pool of auxiliary coolant water 48, derived from condensed steam and collected hot water, can be gravity fed or driven into the reactor pressure vessel 14 through a fluid conduit 52 having an optional flow controlling valve, to add cooling water as needed to the fuel core 16 for submerging the fuel core and controlling its temperature.

Noncondensible such as nitrogen gas from the controlled protective atmosphere of the containment structure which passes unchanged through the heat exchanger unit 34, along with any uncondensed steam vapor and other vapor phase components, are divided out from the condensed steam liquid water in the liquid/vapor phase separating device(s) 44. This noncondensible phase, frequently mixed with some uncondensed steam, etc. is conveyed through at least one fluid vent duct 54 downward into the suppression pool chamber(s) 22 and discharged into the pool of coolant water 24 retained therein just below its surface for further cooling and disposal.

According to a contemporary reactor design the vent duct 54 extending down from the liquid/vapor phase separating device 44 terminates with its open lower end 56 below the surface of the suppression water pool 24 at a level above the opening of the uppermost suppression pool vents 26. This design prescription ensures that the expected positive pressure differential that persists long term after a loss of coolant event between the atmosphere within the containment structure 12 and the suppression pool chamber 22 will maintain the isolation container(s) 28 and its heat exchanger unit(s) 34 effective in their intended roles. The action of such a pressure differential is to provide a fluid flow of steam and noncondensibles from the containment structure 12 atmosphere to and through the heat exchanger unit(s) 34 of the isolation container(s) 28 whereby at least some of the steam is condensed with the heat of vaporization being transferred to the isolation coolant water pool 30, while any noncondensibles and any uncondensed steam vapor are driven by this pressure difference to pass through the heat exchanger unit 34 and on to the suppression pool 24 via the vent duct 54.

At the lower open end 56 of the vent duct 54, noncondensibles emitted therefrom to below the surface of the upper layers of the condensing coolant water pool 24 of the suppression chamber 22 proceed to rise due to buoyancy and emerge from the surface of the coolant water pool, while any steam vapor is condensed in the surrounding cooler water. Ultimately, the continued introduction of hot noncondensibles and condensing of steam adjacent to the vent duct 54 outlet warms the immediate surrounding water producing a hot upper layer in the pool of water 24 which due to its buoyancy or lower density spreads as a stratum over the entire upper surface portion of the suppression pool 24. This warmer layer will develop over a depth which is only slightly greater than the extent of submersion of the vent duct 54 down below the pool surface because the eddy current induced by the entering gases is only of comparable depth dimensions.

In the absence of a forced circulation means or other heat removal mechanism operating in the suppression pool 24, the warm upper stratum formed in the water is not significantly dispersed downward and throughout the pool. As such the suppression chamber pool 24 develops a phenomenon of thermal stratification where a hot, or increasingly hotter surface area layer persists, and a cooler and denser portion extends therefrom downward. The interface between these two thermal layers is characterized by a very pronounced difference in temperature over a very small physical elevation distance.

The consequences of this thermal stratification is that the cool lower area of the pool is effectively isolated from functioning as a heat sink for condensing steam vapor that is carried into the suppression pool 24 along with noncondensible gases through the vent duct 54. Thus progressive warming of the upper stratum of water occurs and once this portion of the water reaches temperatures corresponding to the steam vapor temperatures, it will progressively develop increasing pressures within the atmosphere of the containment structures 12. Over an extended period of time following an event such as a loss of coolant accident, there develops progressively increased pressures and temperatures within the containment structure which can reach or exceed the structure designed limits, threatening its integrity.

In accordance with this invention, a tubular sleeve 58 is submerged within the cooling water 24 of the suppression pool(s) 22 generally vertically positioned therein in axial alignment with the end portion of the vent duct 54. The upper open end of the tubular sleeve 58, which is of greater diameter than the vent duct 54, extends upward above and surrounds the lower open end 56 of the vent duct 54 in spaced apart relationship, and the lower open end of the sleeve is spaced above the bottom of the suppression pool chamber 22 so that the cooling water of the pool can enter and/or exit the hollow sleeve 58 and pass through the length thereof. Preferably both the upper and lower open annular ends of tubular sleeve 58 are flared outward as illustrated.

The tubular sleeve 58 is supported and securely fixed in position by means of several struts 60 arranged around the sleeve in spider-like fashion, for example three or four struts deployed generally equally spaced about the hollow sleeve 56 for resisting vibrations due to high pressure steam and gases.

The tubular sleeve 58 is positioned with its upper end surrounding the outlet end of the vent duct 54 and below the surface of the pool of condensing coolant water 24 of the suppression pool chamber 22. Tubular sleeve 58 extends downward in the coolant water of the suppression pool and terminated therein at a depth substantially below the level wherein a warm stratification layer would otherwise form. Preferably the lower open end of the tubular sleeve 58 is spaced up from the bottom of the suppression pool chamber 24 a distance of about one half of the sleeve diameter.

During the emission of a gaseous mixture of noncondensibles, such as nitrogen, and/or steam vapor there is a significant tendency for the occurrence of a localized upward flow to develop in the pool around the downward discharge vent duct 54, driven in part by the same processes of natural circulation which are present during boiling in a natural circulation boiler. Under these circumstances, as long as the radius of the flow cross-section of the tubular sleeve 58 in the vicinity of the fluid vent 54 outlet 56 is not equal to or larger than the diameter of the original eddy current cell, considered to be nominally of the diameter of the vent duct submersion depth, the natural circulation that occurs will produce within the suppression pool 22 a characteristic eddy current cell having a diameter of the approximate length of the tubular sleeve 58. Thus, with this invention, an eddy current cell occurs which extends substantially throughout the entire pools depth. Upward moving flow within the tubular sleeve 58 necessarily involves flow entering the tubular sleeve from the bottom. This flow path insures that fluid located adjacent the bottom of the suppression pool chamber does not remain stagnant and the entire pool gradually undergoes vertical circulation.

Accordingly, the warming action within the suppression pool chamber 22, previously confined to a narrow surface layer of water, with the invention engages virtually the entire water content of the pool. The tubular sleeve 58 so dispositioned in the suppression pool chamber 22 thus provides for full pool circulation and mixing. This results in the suppression pool surface warming and pressure rise being slower with the improvement in a post loss of coolant accident of long-term containment structure pressure/temperature response of the improved passive cooling containment concept.

Figure 3:
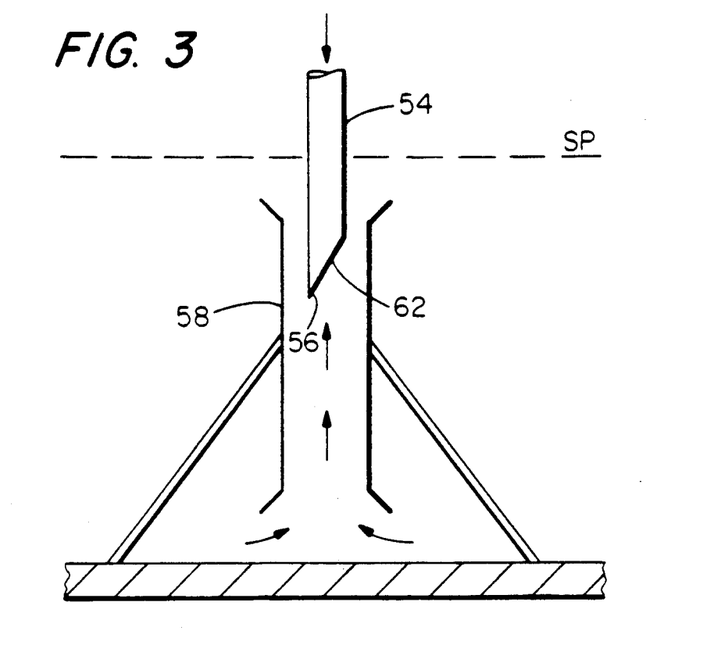
FIG. 3 is a detailed partial sectional view of a variation of the suppression pool shown in FIG. 2.
Figure 4:
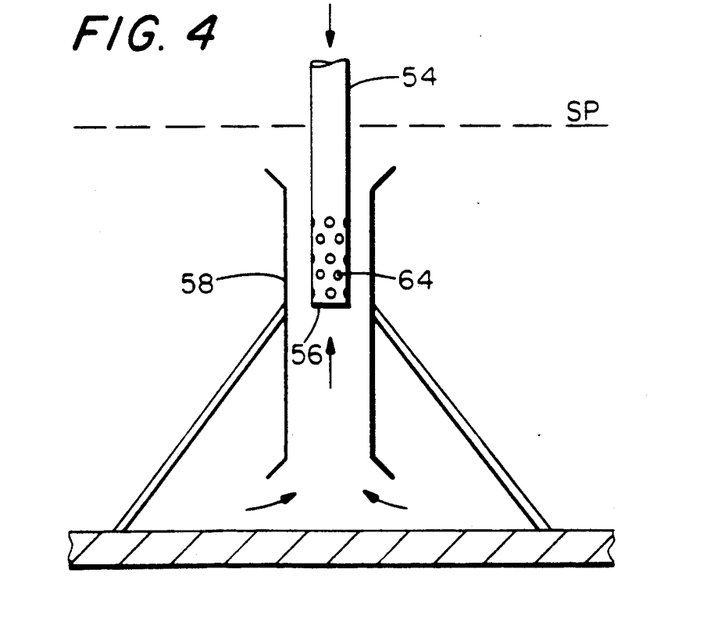
FIG. 4 is a detailed partial sectional view of another variation of the suppression pool shown in FIG. 2.
Figure 5:
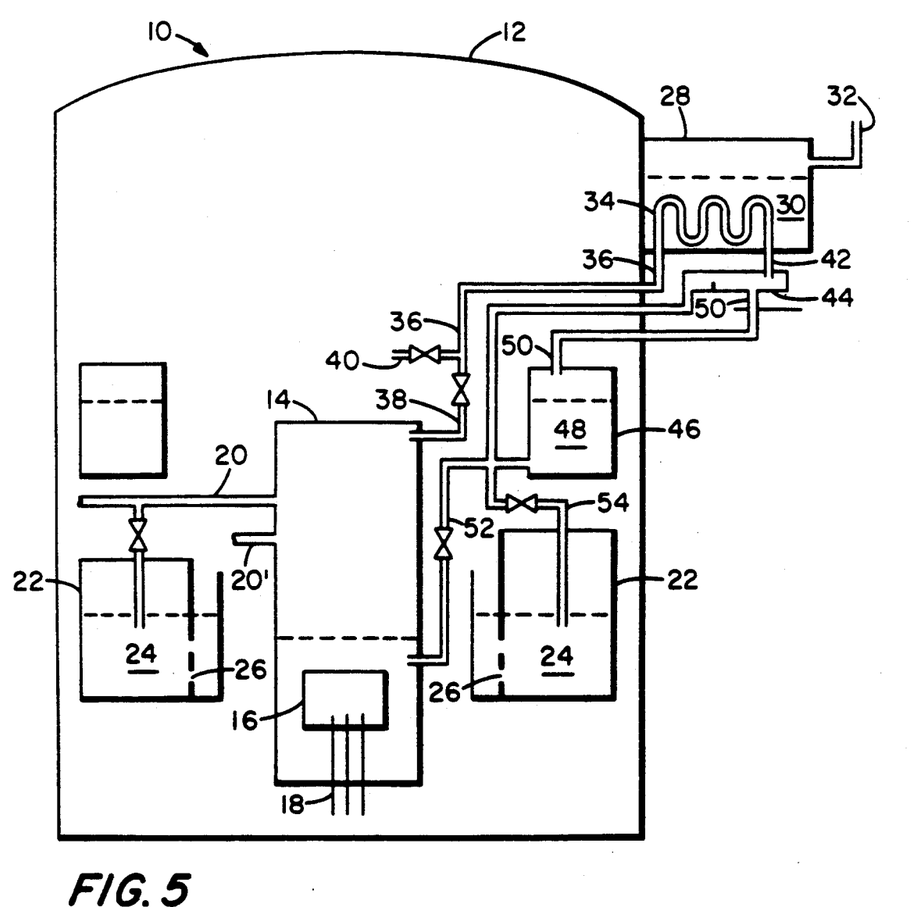
FIG. 5 is a vertical sectional view of a variation of the nuclear reactor plant comprising a containment structure housing a nuclear reactor pressure vessel and associated components of the auxiliary cooling system of FIG. 1.

The outlet 56 of the vent duct 54 within tubular sleeve 58 can lie in a plane parallel with the water surface of the suppression pool 24 as shown in FIG. 2. Alternatively, to promote flow stability during periods of relatively low rates of gas flow out from the vent duct 54, this outlet 56 can lie in a plane slanted or biased 62 with respect to the horizontal water surface of pool 24 as shown in FIG. 3. The upper most edge of the slanted or inclined outlet of the vent duct 54 is at the specified maximum submergence dept as the vent pipe outlet 56 in a horizontal plane parallel to the water surface. In another version the vent duct 54 can be extended below the specified maximum submergence depth down into the suppression pool 24 with an extended-length portion having therein a multiplicity of orifices 64 around its lower wall periphery, and thereby communicating the interior of the vent duct 54 with the suppression pool 24 at a variety of submergence depths with the topmost such orifice positioned at the specified maximum submergence depth. Other appropriate measures can be applied to promote vent gas flow stability from vent duct 54 and thereby promote upward flow stability of the liquid within the lower portion of tubular sleeve 54.

What is claimed is:

1. A water cooled, nuclear fission reactor plant having an improved auxiliary passive cooling system for dissipating heat produced during periods of other than normal operation, the nuclear fission reactor plant comprising the combination of: a reactor pressure vessel containing a core of heat producing fissionable fuel material provided with reciprocally removable fission control rods and having external steam and hot coolant water conduits extending out therefrom including a circulation loop passing through a heat exchanger comprising a steam driven turbine, said reactor pressure vessel and adjacent components being housed within an enclosing, substantially gas impermeable containment structure for retaining a gaseous atmosphere enveloping the reactor pressure vessel and adjacent components;
   a container retaining a pool of cooling water isolated from the atmosphere of the containment structure and positioned at a level within the containment structure above the reactor pressure vessel, said isolation container including a heat exchanger unit submerged in the retained pool of cooling water having an inlet which is in optional fluid communication with the interior of the reactor pressure vessel and with the atmosphere of the containment structure enveloping the pressure vessel;
   a suppression pool chamber containing a pool of cooling water for condensing steam positioned adjacent to the reactor pressure vessel and having a horizontal vent passing to an adjoining area which is in open communication to the atmosphere of the containment structure;
   a vent duct extending from an outlet of the heat exchanger unit submerged in the isolation container pool downward into the suppression pool chamber with its open end terminating below the surface of the cooling water pool and above the level of the horizontal vent passing an adjoining area, a tubular sleeve submerged within the cooling water pool of the suppression chamber generally vertically positioned in axial alignment with the end of the vent duct and having an upper open end extending upward above and surrounding the lower open end of the vent duct in spaced apart relation and a lower open end spaced above the bottom of the suppression pool chamber whereby cooling water in the suppression pool chamber can be impelled to circulate by a downward fluid discharge from the heat exchanger submerged in the pool of the isolation chamber through the vent duct in a circular path including down within the tubular sleeve and continuing upward around the outer periphery of the said vent duct within the interior of the tubular sleeve and recycling again downward external to the tubular sleeve thence upward within the tubular sleeve entering into the said tubular sleeve at its bottom open end and repeating the cycle to effectively distribute introduced thermal energy more evenly throughout the suppression chamber pool of cooling water.

2. The water cooled, nuclear fission reactor plant having an improved auxiliary passive cooling system for dissipating heat produced during periods of other than normal operation of claim 1, wherein the tubular sleeve is provided with an annular outward flow at its upper end and at its lower end.

3. The water cooled, nuclear fission reactor plant having an improved auxiliary passive cooling system for dissipating heat produced during periods of other than normal operation of claim 1, wherein a multiplicity of heat exchanger units are submerged in the isolation container pool.

4. The water cooled, nuclear fissin reactor plant having an improved auxiliary passive cooling system for dissipating heat produced during periods of other than normal operation of claim 3, wherein a vent duct extends from the outlet of each heat exchanger unit down into the suppression pool chamber.

5. A water cooled, nuclear fission reactor plant having an improved auxiliary passive cooling system for dissipating heat produced during periods of other than normal operation, the nuclear reactor plant comprising the combination of: a reator pressure vessel containing a core of heat producing fissionable fuel material provided with reciprocally removable fission control rods and having external steam and hot coolant water conduits extending out therefrom including a circulation loop passing through a heat exchanger comprising a steam driven turbine, said reactor pressure vessel and adjacent components being housed within an enclosing, substantially gas impermeable containment structure for retaining a gaseous atmosphere enveloping the reactor pressure vessel and adjacent components;

at least one container retaining a pool of cooling water isolated from the atmosphere of the containment structure and positioned at a level within the containment structure above the reactor pressure vessel, said isolation container including at least one heat exchanger unit submerged in the retained pool of cooling water having an inlet which is in optional fluid communication with the interior of the reactor pressure vessel and in optional fluid communication with the atmosphere of the containment structure enveloping the pressure vessel;

at least one suppression pool chamber containing a pool of cooling water for condensing steam positioned adjacent to the reactor pressure vessel and having a horizontal vent passing to an adjoining area which is in open communication to the atmosphere of the containment structure;

a vent duct extending from an outlet of each heat exchanger unit submerged in each isolation container pool downward into a suppresion pool chamber with its open lower end terminating below the surface of the cooling water pool and above the level of the horizontal vent passing to an adjoining area, a tubular sleeve of larger diameter than the vent duct submerged within the cooling water pool of a suppression chamber generally vertically positioned in axial alignment with the open lower end of the vent duct and having an upper open end extending upward above and surrounding the lower open end of the vent duct in spaced apart relation and a lower open end spaced above the bottom of the suppression pool chamber whereby cooling water in the suppression pool chamber can be impelled to circulate by a downward fluid discharge from a heat exchanger submerged in the pool of an isolation chamber through a vent duct in a circular path including down within the tubular sleeve and continuing upward around the outer periphery of the said vent duct within the interior of the tubular sleeve and recycling again downward external to the tubular sleeve thence upward within the tubular sleeve entering into the said tubular sleeve at its bottom open end and repeating the cycle to effectively distribute introduced thermal energy more evenly throughout the suppression chamber pool of cooling water.

6. The water cooled, nuclear fission reactor plant having an improved auxiliary passive cooling system for dissipating heat produced during periods of other than normal operation of claim 5, wherein the isolation container is located outside of the containment structure.

7. The water cooled, nuclear fission reactor plant having an improved auxiliary passive cooling system for dissipating heat produced during periods of other than normal operation of claim 5, wherein the isolation container and the liquid/vapor phase separating device are both located outside of the containment structure.

8. The water cooled, nuclear fission reactor plant having an improved auxiliary passive cooling system for dissipating heat producing during periods of other than normal operating of claim 5, wherein the heat exchanger unit and the liquid/vapor phase separating device are integrated into a composite component.

9. The water cooled, nuclear fission reactor plant having an improved auxiliary passive cooling system for dissipating heat produced during periods of other than normal operation of claim 5, wherein the vent duct extending from the outlet of each heat exchanger unit down into the suppression pool chamber and terminates therein with an open end having a biased opening.

10. The water cooled, nuclear fission reactor plant having an improved auxiliary passive cooling system for dissipating heat produced during periods of other than normal operation of claim 5, wherein the vent duct extending from the outlet of each heat exchanger unit down into the suppression pool chamber is provided with a multiplicity of lateral orifices in the duct wall adjacent its end outlet.

* * * * *